H. P. MARSHALL.
TOY OR GAME.
APPLICATION FILED JAN. 30, 1918.
1,322,713.
Patented Nov. 25, 1919.
3 SHEETS—SHEET 1.
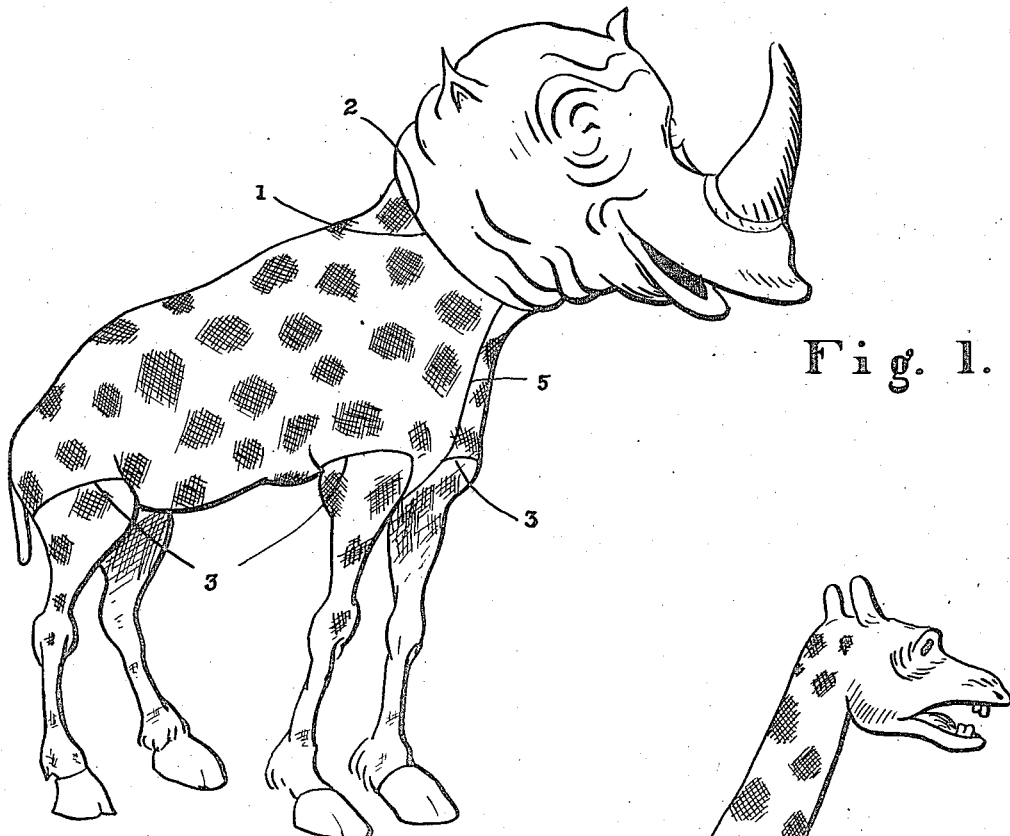
Fig. 1.
Fig. 2.
WITNESS:
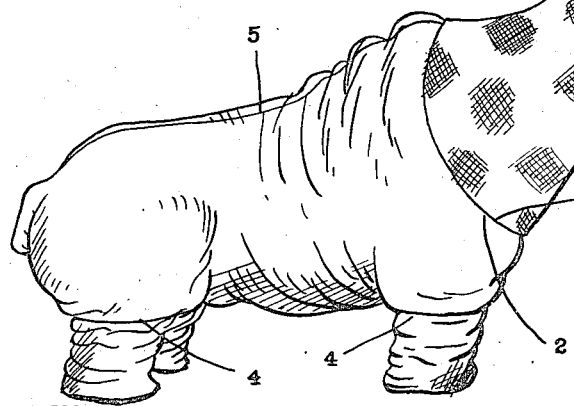
INVENTOR:
Harry P. Marshall,
Russell W. Everett,
ATTORNEY.

H. P. MARSHALL.
TOY OR GAME.
APPLICATION FILED JAN. 30, 1918.

1,322,713.

Patented Nov. 25, 1919.
3 SHEETS—SHEET 2.

WITNESS:
Howard P. King

INVENTOR:
Harry P. Marshall,
BY
Russell M. Everett,
ATTORNEY.

H. P. MARSHALL.
TOY OR GAME.
APPLICATION FILED JAN. 30, 1918.
1,322,713.
Patented Nov. 25, 1919.
3 SHEETS—SHEET 3.
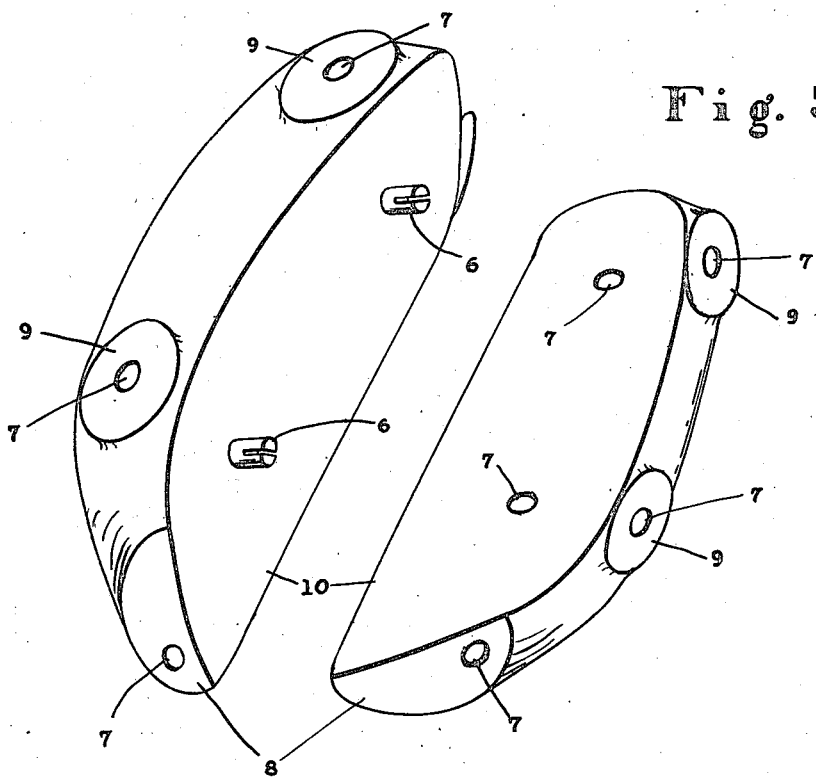
Fig. 5.
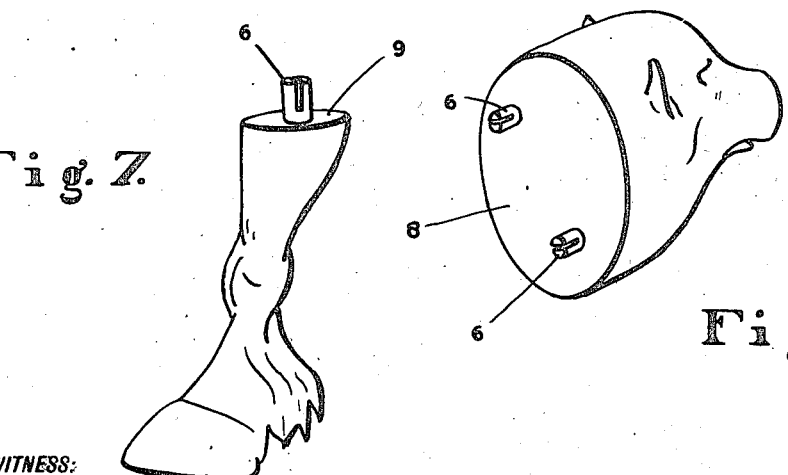
Fig. 7.
Fig. 6.
WITNESS:
Howard P. King.
INVENTOR:
Harry P. Marshall,
BY
Russell Everett,
ATTORNEY.

UNITED STATES PATENT OFFICE.

HARRY P. MARSHALL, OF GLEN RIDGE, NEW JERSEY, ASSIGNOR, BY DIRECT AND MESNE ASSIGNMENTS, OF ONE-THIRD TO HOWARD B. FREEMAN, OF NEWARK, NEW JERSEY, AND ONE-THIRD TO CHARLES J. FARR, OF BAYONNE, NEW JERSEY.

TOY OR GAME.

1,322,713.  Specification of Letters Patent.  Patented Nov. 25, 1919.

Application filed January 30, 1918. Serial No. 214,445.

*To all whom it may concern:*

Be it known that I, HARRY P. MARSHALL, a citizen of the United States, and a resident of Glen Ridge, in the county of Essex and State of New Jersey, have invented new and useful Improvements in Toys or Games, of which the following is a specification.

The objects of this invention are to provide an amusing and instructive toy or game which shall attract because of its novelty; to this end to provide a plurality of pieces of different animals adapted to fit together,— and form a single animal of composite structure; to provide such pieces or parts of animals having corresponding surfaces for fitting them together, all said surfaces of the same kind being of substantially the same contour and size; to provide means on said surfaces at a distance from the edges thereof for holding them together, whereby said holding means are concealed when the parts are assembled; to secure a simple construction by which the parts can be readily put together and taken apart, and to obtain other advantages and results as may be brought out in the following description.

Referring to the accompanying drawings, in which like numerals of reference indicate the same parts throughout the several views, Figures 1 and 2 illustrate two animals produced by my toy or game; being a giraffe and a rhinoceros with the heads exchanged;

Figs. 5, 6 and 7 are detail views illustrating how the various parts may be connected.

Figure 3:
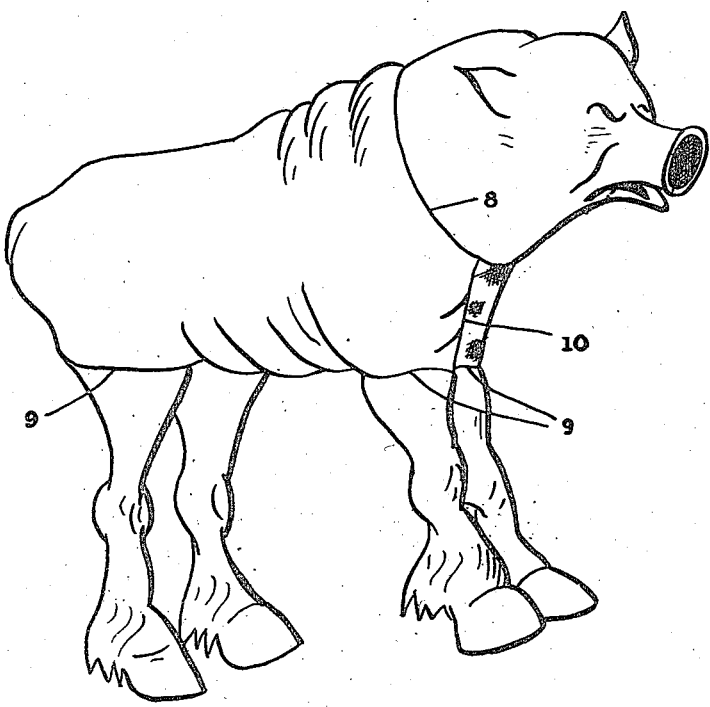
Fig. 3 illustrates a more composite animal its body being one-half giraffe and the other half rhinoceros and having a pig's head and donkey's legs.

In carrying out my invention, the bodies of various animals are conventionalized so that when dissected the surfaces of separation will all be similar and thus parts can be put together without regard to whether or not they are all parts of the same animal or not. For example, as shown in Figs. 1 and 2 the heads of two animals may be interchangeable, the surfaces upon which they are cut off, represented by reference numeral 1 for the giraffe and reference numeral 2 for the rhinoceros being similar, both in contour and area so that either head will fit upon either body. Likewise the legs of both animals may be detachable as at 3 for the giraffe and 4 for the rhinoceros, all said surfaces being of the same contour and area, so that the legs may be interchanged as desired. Furthermore, the body may be divided into parts, as I have illustrated by showing it split vertically longitudinally at 5, so that as in Fig. 3, one-half of the giraffe body may be put with one-half of the rhinoceros body, and thus the objects of my invention secured to a still further extent. Obviously the body may be divided into as many parts as desired, and in fact it is within the scope of my invention to carry the subdivision of the animals to any extent desired. This may easily be done so far as it is possible to conventionalize animals so that the surfaces of separation are of the same contour and area or substantially the same, and it will be appreciated that the further the subdivision is carried the more ludicrous the effects which can be produced.

Figure 4:
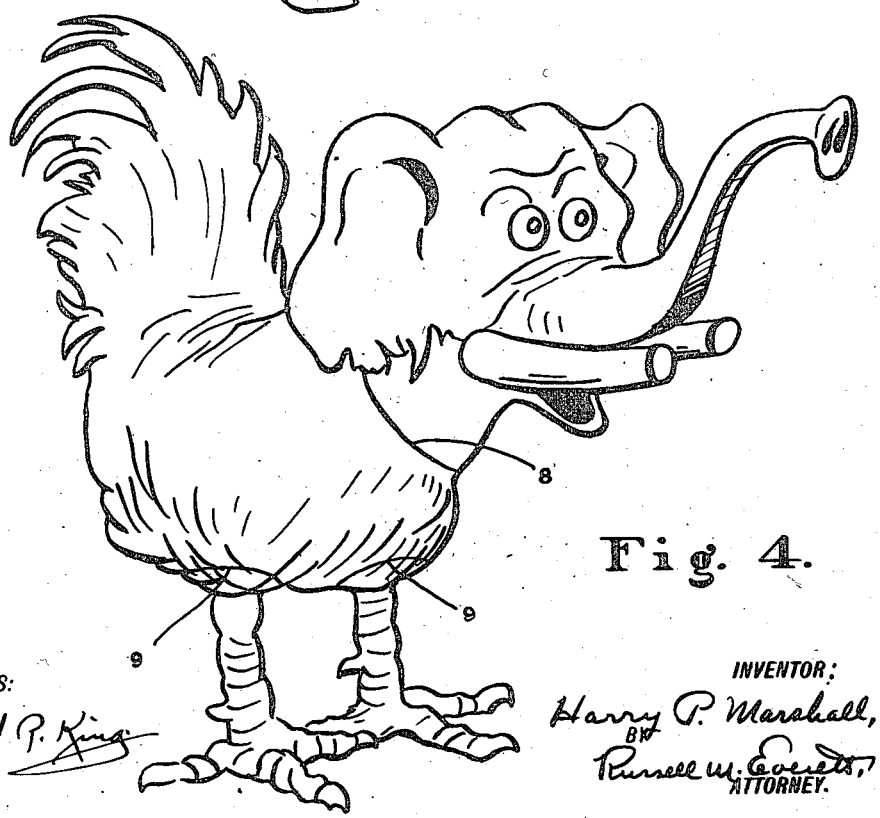
Fig. 4 illustrates a rooster fitted with an elephant's head.

In Fig. 4 I have illustrated a biped whose two legs and head are removable so that they can be exchanged for any of the other heads or legs shown in the drawings, and obviously by supplying two sets of biped legs they could be applied to a quadruped, if desired.

It will be understood that whatever the animal the contour and area of the surface upon which the head is cut off is always substantially the same and similarly the contour and area of the surface upon which the legs are cut off and upon which the body is divided, so that in Figs. 3 to 6 the neck divisions 8, the leg divisions 9 and the body divisions 10 are all the same as the corresponding divisions in Figs. 1 and 2.

By coloring the parts of the animals, as might suggest itself to those artistically skilled in the art, the objects of my invention may be emphasized and still further brought out, whether the parts be colored naturally or fancifully.

The various parts into which the animals are divided by my invention may be temporarily connected by any suitable means on the connecting surfaces which is located at a distance from the edges thereof so as to be concealed when the parts are connected. As illustrative of such means, I have shown pins 6 projecting from one of two surfaces to be fitted together and adapted to enter corresponding sockets 7 in the other surfaces, the ends of said pins being split to hold better. Both said pins and sockets are spaced from the edges of the connecting surfaces in which they are located, and thus are completely concealed when the parts are connected, and other suitable connecting means so located could be employed.

Obviously various other modifications and changes may be made in manufacturing my toy or game, without departing from the spirit and scope of the invention, and I do not wish to be understood as limiting myself except as required by the following claims when construed in the light of the prior art.

Having thus described my invention, what I claim is:

1. The hereindescribed toy or game, comprising a plurality of dissimilar parts of animals having corresponding surfaces adapted to be fitted together to form a complete animal, all said surfaces of the same kind being of substantially the same contour and size, and means on said surfaces at a distance from the edges thereof for holding the parts together, whereby said holding means are concealed when the parts are connected.

2. The hereindescribed toy or game, comprising a plurality of dissimilar parts of animals having corresponding flat surfaces adapted to fit together to form a complete animal, all said surfaces of the same kind being of substantially the same contour and size, and means on said flat surfaces at a distance from the edges thereof for holding the parts together, whereby said holding means are concealed when the parts are connected.

3. The hereindescribed toy or game, comprising a plurality of dissimilar parts of animals having corresponding surfaces adapted to fit together to form a complete animal, all of said surfaces of the same kind being of substantially the same contour and size and each pair of corresponding surfaces being provided one with a projection and the other with a socket adapted to releasably hold said projection, said projection and socket being spaced from the edges of the surfaces on which they are placed, whereby they are concealed when the parts are connected.

HARRY P. MARSHALL.